Dec. 9, 1952 B. MESSING 2,621,139
LAMINATED SHEET MATERIAL AND METHODS OF MAKING SUCH MATERIAL
Filed Aug. 12, 1947 2 SHEETS—SHEET 1

INVENTOR.
BENJAMIN MESSING
BY
Luther W. Hawley.
ATTORNEY.

Dec. 9, 1952   B. MESSING   2,621,139
LAMINATED SHEET MATERIAL AND METHODS OF MAKING SUCH MATERIAL
Filed Aug. 12, 1947   2 SHEETS—SHEET 2

INVENTOR.
BENJAMIN MESSING
BY
*Luther W Hawley*
ATTORNEY.

Patented Dec. 9, 1952

2,621,139

UNITED STATES PATENT OFFICE 2,621,139

LAMINATED SHEET MATERIAL AND METHODS OF MAKING SUCH MATERIAL

Benjamin Messing, Hoboken, N. J.

Application August 12, 1947, Serial No. 768,238

9 Claims. (Cl. 154—106)

This invention relates to laminated sheet material and methods of making such material.

More specifically stated, the invention relates to flexible, moisture proof or moisture resistant padded, laminated material which may be adapted for many uses, such as upholstery material, bed pads, table covers, beach blankets, and many other articles.

The laminated material comprises outer sheets of thermoplastic material and an intermediate layer of suitable padding or wadding. In order to maintain the shape and condition of the padding between the sheets and outer covers, it is secured at spaced intervals and in the usual practice by stitching, and the material is quilted or stitched to form an attractive design of the desired configuration.

This invention more especially relates to laminated sheet material comprising outer covers or sheets which are moisture proof or moisture resistant. Stitching such sheets through the intermediate layer forms perforations through which moisture can enter and, furthermore, the material easily tears on the perforations.

This invention, therefore, has for its salient object to provide a laminated, moisture proof or moisture resistant material having an intermediate layer of padding and having the outer sheets or covers fused or bonded together at spaced intervals through the intermediate layer, the covers being so joined or bonded that they will be impervious to moisture.

Another object of the invention is to provide a simple, practical and efficient method of making a continuous sheet of laminated sheet material of the character described.

Another object of the invention is to provide a method of fusing thermoplastic sheets together at spaced intervals through an intermediate layer of padding material by the application of heat and pressure.

Another object of the invention is to provide a method of fusing or bonding a plurality of thermoplastic sheets at spaced intervals through a plurality of layers of padding material disposed between successive sheets of thermoplastic material.

Another object of the invention is to provide a method of fusing or bonding flexible thermoplastic sheets or webs through an intermediate layer of padding and in the same operation forming an ornamental design on a laminated material.

Further objects of the invention will appear from the following specification taken in connection with the drawings which form a part of this application, and in which Fig. 1 is a diagrammatic elevational view illustrating one form of apparatus for carrying out the method of laminating the material;

Figure 1:
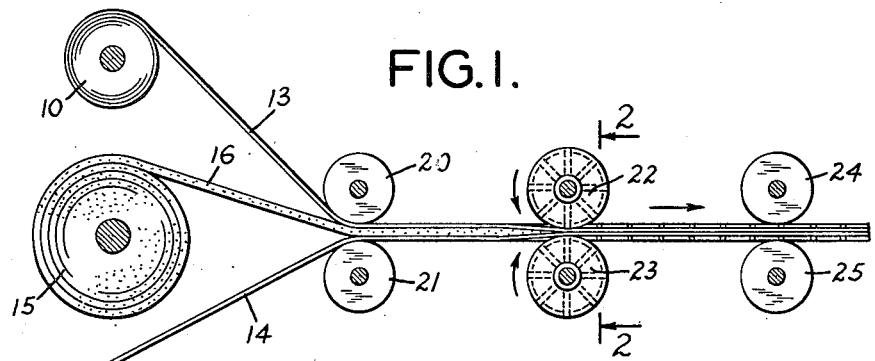

In the particular embodiment of the invention illustrated in the drawings, the apparatus illustrated in Fig. 1 comprises supply rolls 10 and 11 having sheets or webs 13 and 14 of suitable thermoplastic material, such as vinyl, polystyrene, polyethylene or cellulose acetate sheeting. Between the supply rolls 10 and 11 there is mounted a supply roll 15 of a sheet or web 16 of suitable padding or wadding material, which may be formed of cotton, shoddy, wool, jute, or any desired fibrous material.

The sheets or webs 13 and 14 with the intermediate layer or web 16 disposed therebetween are led from the supply rolls 10, 11 and 15 between a pair of guiding and feeding rolls 20 and 21 and thence in superposed relation between a pair of pressing and heating rolls 22 and 23. After the material has been fused and pressed in the manner hereinafter described by the rolls 22 and 23, it is led between a pair of delivery rolls 24 and 25.

Figure 2:
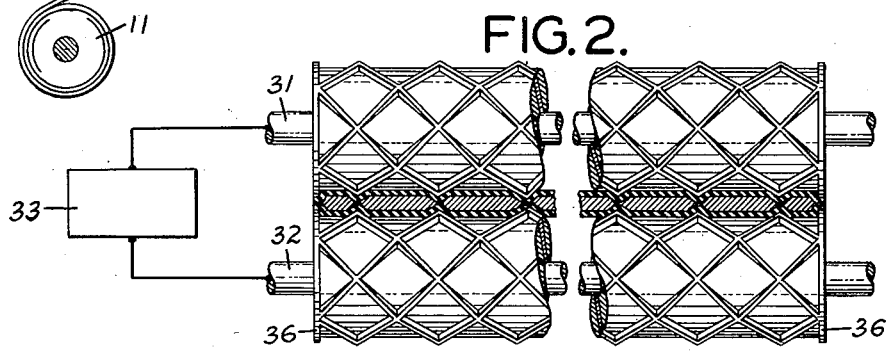
Fig. 2 is an elevational view, on an enlarged scale, partly in section, illustrating the rolls for applying heat and pressure, this view being taken substantially on line 2—2 of Fig. 1, looking in the direction of the arrows.
Figure 3:
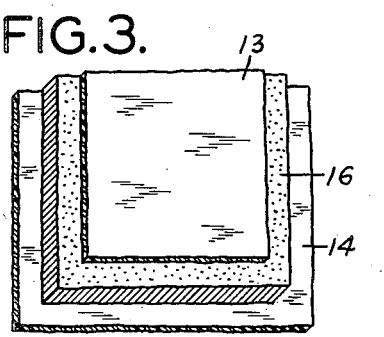
Fig. 3 is a plan view, partly broken away and partly in section, illustrating the superposed sheets of thermoplastic material with the intermediate layer of padding or wadding disposed therebetween prior to the operation of the pressing and sealing rolls.
Figure 5:
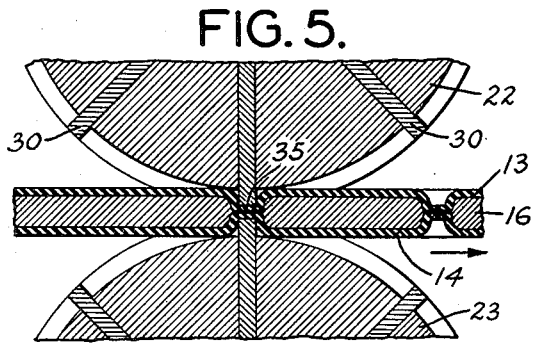
Fig. 5 is an enlarged sectional elevation, partly broken away, illustrating the operating portions of the pressure and sealing rolls with the laminated material disposed therebetween.
Figure 6:
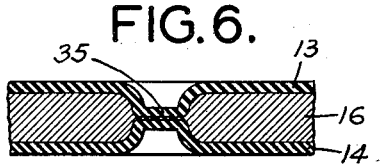
Fig. 6 is an enlarged sectional elevation taken substantially on line 6—6 of Fig. 4, looking in the direction of the arrows, and illustrating the laminated material and particularly one of the fused or bonded portions thereof.

In the form of the invention illustrated, the material is fused by passing a high frequency current therethrough at spaced intervals and by pressure applied at these intervals or at the points of fusing. The pressure rolls 22 and 23 may have any desired configuration of design formed on the peripheries thereof to impress this design on the material. As shown, each of the rolls 22 and 23 has incorporated therein ribs 30 which extend to the shafts 31 and 32 of the rolls 22 and 23, and there is shown at 33, diagrammatically, suitable apparatus for producing high frequency currents which are conducted to the shafts 31 and 32 and thence through the ribs 30 to the material compressed by the ribs in the manner shown particularly in Figs. 2, 5 and 6. This high frequency current which causes the generation of heat in the compressed material so as to bring about fusion along the lines of registration of the outer ends of the ribs 30, the material of the sheets 13 and 14 being fused completely through the compressed intermediate layer 16 of padding or wadding. The outer edges of the sheets are also compressed and fused by ribs 36 which conduct the high frequency current to the material and compress it in the manner hereinbefore described.

Figure 4:
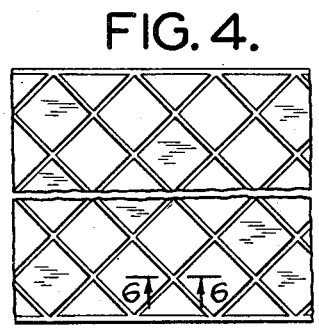
Fig. 4 is a plan view, partly broken away, illustrating the finished material.

Although the design illustrated on the rolls and on the finished material, as shown in Fig. 4, is a criss-cross design, it will be understood that this is optional and that any other desired configuration or design may be impressed upon the material. It will be obvious, however, that the designs formed on the two rolls 22 and 23 must be the same and must register in order to transmit the high frequency current through the compressed laminations in the manner hereinbefore described.

In Figs. 1 to 6 inclusive the method is illustrated as joining or bonding two outer sheets of thermoplastic material through an intermediate layer of padding material. This represents the basic idea of the invention but the method may be worked out in such a manner as to provide a laminated material embodying a plurality of intermediate layers of padding interposed between successive sheets of thermoplastic material. Such a form of the invention is illustrated in Figs. 7 and 8.

Figure 7:
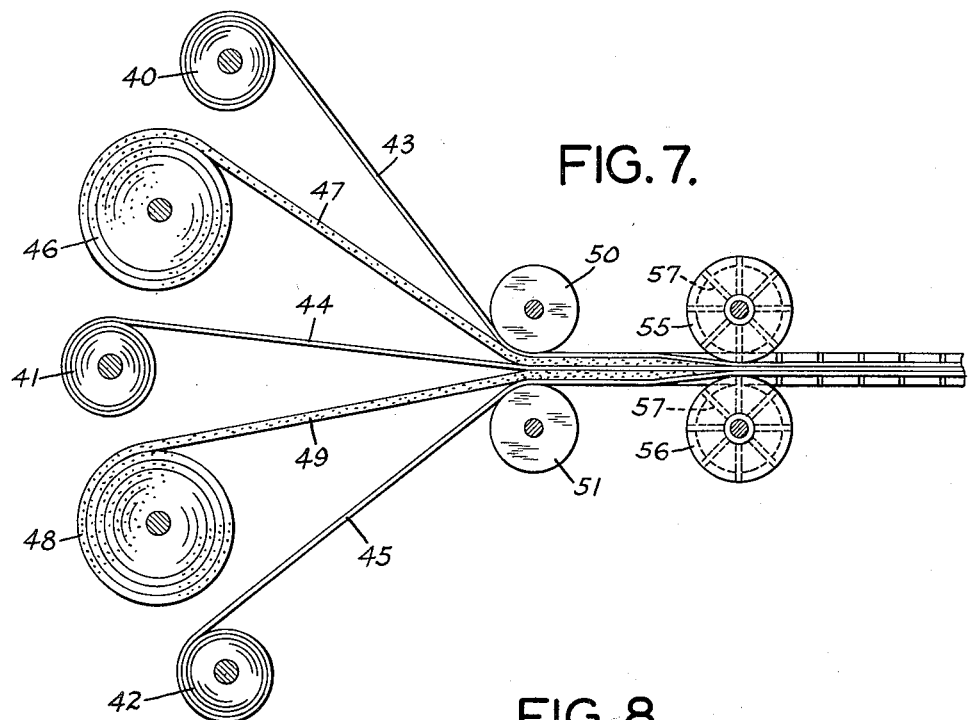
Fig. 7 is a view similar to Fig. 1 showing a modified embodiment of the invention.
Figure 8:
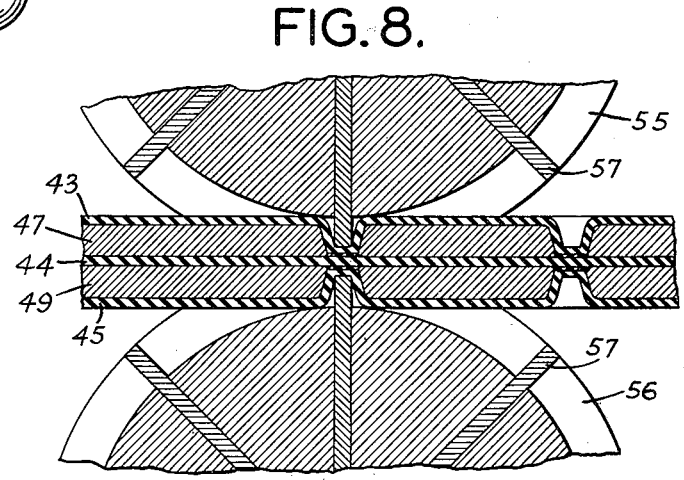
Fig. 8 is a view similar to Fig. 5 showing the operation of the pressing and sealing rolls on the superposed sheets and layers shown in Fig. 7.

In Fig. 7 there are shown a plurality of supply rolls 40, 41, 42 of thermoplastic webs or sheets 43, 44, 45. Intermediate rolls 40 and 41 is a supply roll 46 of padding or wadding material 47. Between rolls 41 and 42 is another supply roll 48 of padding material 49.

These superposed layers 43, 47, 44, 49 and 45 are led between rolls 50 and 51 and thence between pressing and sealing or bonding rolls 55 and 56. The material between the ribs 57 of rolls 55 and 56 is compressed and the high frequency current passes through and fuses the compressed areas through the intermediate layers of padding, thus uniting the successive sheets or webs of thermoplastic material in the same manner as the sheets 13 and 14 in Figs. 1 to 6.

In this manner a blanket or sheet having a plurality of layers of padding may be formed.

In the claims, the term "self-sustaining" is used in some instances to describe the nature of the outer sheets. This term is intended to carry the meaning that the thermoplastic outer sheets which are fused through the padding, are substantial sheets which will hold their shape by themselves, as distinguished from a film or coating which might be applied to another sheet or a sheet having a coating of gum, wax, glue, or similar coating, and in which the thermoplastic would need this other sheet to hold it in shape or position.

Although certain specific embodiments of the invention have been particularly shown and described, it will be understood that the invention is capable of further modification and no limitations are intended other than those imposed by the following claims.

What I claim is:

1. The method of making a continuous padded laminated material which comprises the placing of a layer of padding between two continuous flexible sheets, one of which is an outside wear-resisting sheet of self-sustaining thermoplastic material of a type which is capable of being repeatedly softened by increase of temperature to a consistency which will permit it to permeate cotton wadding and of being hardened by decrease of temperature and then applying heat and pressure at successive selected areas until the bodies of the three layers are fused together by the thermoplastic material.

2. The method of making a continuous padded laminated material which comprises the placing of a layer of padding between two outer continuous flexible sheets of self-sustaining thermoplastic material of a type which is capable of being repeatedly softened by increase of temperature to a consistency which will permit it to permeate cotton wadding and of being hardened by decrease of temperature and then applying pressure and heat at successive areas until the bodies of the two layers of thermoplastic material are fused together through the intermediate layer of padding.

3. The method of making a continuous padded laminated material which comprises the placing of a layer of porous non-plastic padding between two outer continuous flexible sheets of self-sustaining thermoplastic material of a type which is capable of being repeatedly softened by increase of temperature to a consistency which will permit it to permeate cotton wadding and of being hardened by decrease of temperature and then applying pressure and heat at successive selected areas until the bodies of the two layers of thermoplastic material are fused together through the intermediate layer of padding.

4. The method of making a continuous padded laminated material which comprises the placing of a layer of padding between two outer continuous flexible sheets of self-sustaining thermoplastic material of a type which is capable of being repeatedly softened by increase of temperature to a consistency which will permit it to permeate cotton wadding and of being hardened by decrease of temperature and then applying pressure and heat at successive areas until the bodies of the two layers of thermoplastic material are fused together through the intermediate layer of padding, the heat being produced by conducting a high frequency current to the outer sheets.

5. The method of making integrated padded laminated material which comprises the placing of an intermediate sheet of porous padding between two outer continuous flexible sheets of self-sustaining thermoplastic material of a type which is capable of being repeatedly softened by increase of temperature to a consistency which will permit it to permeate cotton wadding and of being hardened by decrease of temperature and then applying pressure and heat to opposite outer surfaces of the thermoplastic sheets at selected areas until the bodies of the two outer layers of the thermoplastic material are fused together through the intermediate padding layer, the superimposed thermoplastic and padding layers being fed along at the same rate of speed as the pressure and heat are applied to the outer sides of the thermoplastic material to complete the integrated laminated material.

6. A continuous flexible laminated sheet material comprising two opposite outer flexible layers, one of which is a self-sustaining thermoplastic material of a type which is capable of being repeatedly softened by increase of temperature to a consistency which will permit it to permeate cotton wadding and of being hardened by decrease of temperature, and an intermediate layer of porous padding therebetween, the bodies of the two other layers being fused together through the body of the intermediate layer at selected predetermined spaces by the thermoplastic, the other spaces being unfused, leaving the padding to remain uncompressed.

7. A continuous flexible laminated sheet material comprising two opposite outer self-sustaining flexible layers of thermoplastic material of a type which is capable of being repeatedly softened by increase of temperature to a consistency which will permit it to permeate cotton wadding and of being hardened by decrease of temperature, and an intermediate layer of porous padding therebetween, the two outer layers being fused together through the body of the intermediate layer at selected predetermined spaces by the thermoplastic, the other spaces being unfused, leaving the padding to remain uncompressed.

8. An imperforate continuous flexible laminated sheet material comprising two opposite outer flexible layers, one of which is of self-sustaining moisture resistant thermoplastic material of a type which is capable of being repeatedly softened by increase of temperature to a consistency which will permit it to permeate cotton wadding and of being hardened by decrease of temperature and an intermediate layer of porous padding therebetween, the bodies of the two outer layers being fused together through the body of the intermediate layer at selected predetermined spaces by the thermoplastic, the other spaces being unfused, leaving the padding to remain uncompressed.

9. A continuous laminated sheet material comprising two opposite outer flexible layers of self-sustaining thermoplastic sheet material of a type which is capable of being repeatedly softened by increase of temperature to a consistency which will permit it to permeate cotton wadding and of being hardened by decrease of temperature and a plurality of layers of padding material, each of said layers of padding material being disposed between two layers of thermoplastic material, said sheets of material being fused through said interposed layers of padding material at selected spaces, the other spaces leaving the padding to remain uncompressed.

BENJAMIN MESSING.

REFERENCES CITED

The following references are of record in the file of this patent:

UNITED STATES PATENTS

| Number | Name | Date |
|---|---|---|
| 166,262 | Corwin | Aug. 3, 1875 |
| 1,781,797 | Williams | Nov. 18, 1930 |
| 2,039,312 | Goldman | May 5, 1936 |
| 2,114,320 | Schneider | Apr. 19, 1938 |
| 2,304,123 | Rowe | Dec. 8, 1942 |
| 2,331,054 | Shively | Oct. 5, 1943 |
| 2,430,459 | Farrell et al. | Nov. 11, 1947 |
| 2,550,006 | Dreyfus | Apr. 24, 1951 |